United States Patent
Horoszczak et al.

(10) Patent No.: US 12,292,244 B2
(45) Date of Patent: May 6, 2025

(54) ADDITIVELY MANUFACTURED HEAT EXCHANGER LAYER

(71) Applicant: Hamilton Sundstrand Corporation, Charlotte, NC (US)

(72) Inventors: Adam Horoszczak, Wrocław (PL); Maciej Ostrowski, Kamieniec Wrocławski (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 168 days.

(21) Appl. No.: 18/062,354

(22) Filed: Dec. 6, 2022

(65) Prior Publication Data

US 2023/0175791 A1    Jun. 8, 2023

(30) Foreign Application Priority Data

Dec. 8, 2021   (EP) ...................................... 21461632

(51) Int. Cl.
*F28F 3/00*   (2006.01)
*F28F 3/08*   (2006.01)

(52) U.S. Cl.
CPC ...................... *F28F 3/08* (2013.01)

(58) Field of Classification Search
CPC .......................................................... F28F 3/02
USPC ......................................................... 165/166
See application file for complete search history.

(56) References Cited

U.S. PATENT DOCUMENTS

| 1,752,879 | A | 4/1930 | Anderson |
| 4,067,384 | A | 1/1978 | Miyakawa |
| 6,378,605 | B1* | 4/2002 | Kutscher ............... F28F 13/003 165/181 |
| 2008/0066888 | A1 | 3/2008 | Tong et al. |
| 2016/0230595 | A1 | 8/2016 | Wong et al. |
| 2021/0254904 | A1* | 8/2021 | Bhaskar ................... F28F 7/02 |

FOREIGN PATENT DOCUMENTS

| EP | 2741047 A2 | 6/2014 |
| EP | 2741047 A3 | 10/2014 |
| EP | 3764049 A1 | 1/2021 |
| FR | 3025594 A1 | 3/2016 |

OTHER PUBLICATIONS

Abstract of FR3025594 (A1), Published: Mar. 11, 2016, 1 page.
European Search Report for Application No. 21461632.8, mailed Apr. 29, 2022, 6 pages.

* cited by examiner

*Primary Examiner* — Davis D Hwu
(74) *Attorney, Agent, or Firm* — CANTOR COLBURN LLP

(57) ABSTRACT

A heat exchanger layer having an inlet side, IN, where a medium enters the layer and an outlet side, OUT, where the medium exits the layer, and a plurality of fins defining a plurality of flow channels for the medium from the inlet side to the outlet side. Each fin has a leading edge adjacent the inlet side and a trailing edge adjacent the outlet side, and wherein the leading edge of a subset of the fins is thicker than the rest of the fin, and the leading edge of the fins intermediate the fins of the subset of fins is recessed with respect to the inlet side compared to the leading edge of the fins of the subset of fins.

10 Claims, 1 Drawing Sheet

ADDITIVELY MANUFACTURED HEAT EXCHANGER LAYER

CROSS-REFERENCE TO RELATED APPLICATIONS

This application claims priority to European Patent Application No. 21461632.8 filed Dec. 8, 2021, the entire contents of which is incorporated herein by reference.

TECHNICAL FIELD

The present disclosure is concerned with additively manufactured or 3D-printed heat exchanger designs and, in particular, heat exchanger designs for use in vehicles and aircraft.

BACKGROUND

Heat exchangers are used to transfer heat between mediums to provide warming or cooling. Heat exchangers are used, for example, in vehicles and aircraft for e.g. air conditioning or environmental control systems (ECS) and/or for providing cooling to electronics and electrical rack mounted equipment, or to heat or cool another medium, for example. Such heat exchangers commonly comprise a flow path/paths for hot and cold mediums. Heath transfer takes place between path surfaces. Such heat exchangers are well-known and will not be described in detail herein.

In recent years, to improve efficiency and reduce fuel consumption, for example, heat exchangers have been developed for vehicles and aircraft. In one example, the warm medium may be bleed air from the engine and the cold medium may be ambient or so-called RAM air. The RAM air is drawn in from outside the aircraft into the heat exchanger. To provide heated air to e.g. the aircraft cabin, the cold RAM air exchanges heat with the hot bleed air in the heat exchanger and heated air at a temperature deemed comfortable for the passengers is ducted into the cabin.

Heat exchangers typically have very thin heat exchange structures (sometimes known as fins) which define channels for the flow of hot air. The flow direction of the hot medium may be varied in relation to the heat exchanger structure and in relation to the cold medium, according to the application.

As mentioned above, though, the fins are generally very thin, to ensure good heat exchange properties. The use of such thin fins can result in the fins becoming damaged. Sources of damage could be high inlet pressure, hailstones, and different types of debris or pollution. When the vehicle, especially an aircraft, is travelling at high speeds, the impact of hailstones on the exposed parts can be very high. Damage can result to the heat exchange fins requiring replacement of the entire heat exchanger.

To address these risks, with conventional plate fin heat exchangers, a strip of thicker material or thicker fins have been provided at the RAM air inlet side of the heat exchanger to provide a so-called hailguard.

A problem with such additional components is that they can cause flow distortion at the medium inlet. Having a thicker part at the inlet can create large temperature gradients through the heat exchanger layer. Further, additional parts add to the cost and complexity of manufacturing or design.

The advent and development of 3D-printing or additive manufacturing which can be used to manufacture more and more parts and components in a whole range of applications has also led to improvements in heat exchangers. Additive manufacturing capabilities allow designers to much more easily and simply form heat exchanger plates and fins to any desired size and shape. With such capabilities, the inventors have been able to consider improved ways of providing effective protection to heat exchanger fins against hail damage in a simple and cost effective manner, whilst ensuring good thermal/heat exchange properties.

SUMMARY

Accordingly, there is provided a heat transfer layer of a heat exchanger, having an inlet side, IN, where a medium enters the layer and an outlet side, OUT, where the medium exits the layer, and a plurality of fins defining a plurality of flow channels for the medium from the inlet side to the outlet side, each fin having a leading edge adjacent the inlet side and a trailing edge adjacent the outlet side, and wherein the leading edge of a subset of the fins is thicker than the rest of the fin, and wherein the leading edge of the fins intermediate the fins of the subset of fins is recessed with respect to the inlet side compared to the leading edge of the fins of the subset of fins.

Also provided is a heat exchanger comprising a plurality of cold layers through which a cold medium flows and a plurality of hot layers through which a hot medium flows, wherein the cold layers comprise a heat transfer layer as defined above.

BRIEF DESCRIPTION OF THE DRAWINGS

Examples according to the disclosure will be described in more detail, with reference to the drawings. It should be noted that variations are possible within the scope of the invention as defined by the claims. The examples are described in the context of a heat exchanger for an aircraft or other vehicle using RAM air as the cooling fluid, but other fluids may be used and the design according to the disclosure may find other applications.

DETAILED DESCRIPTION

Figure 1:
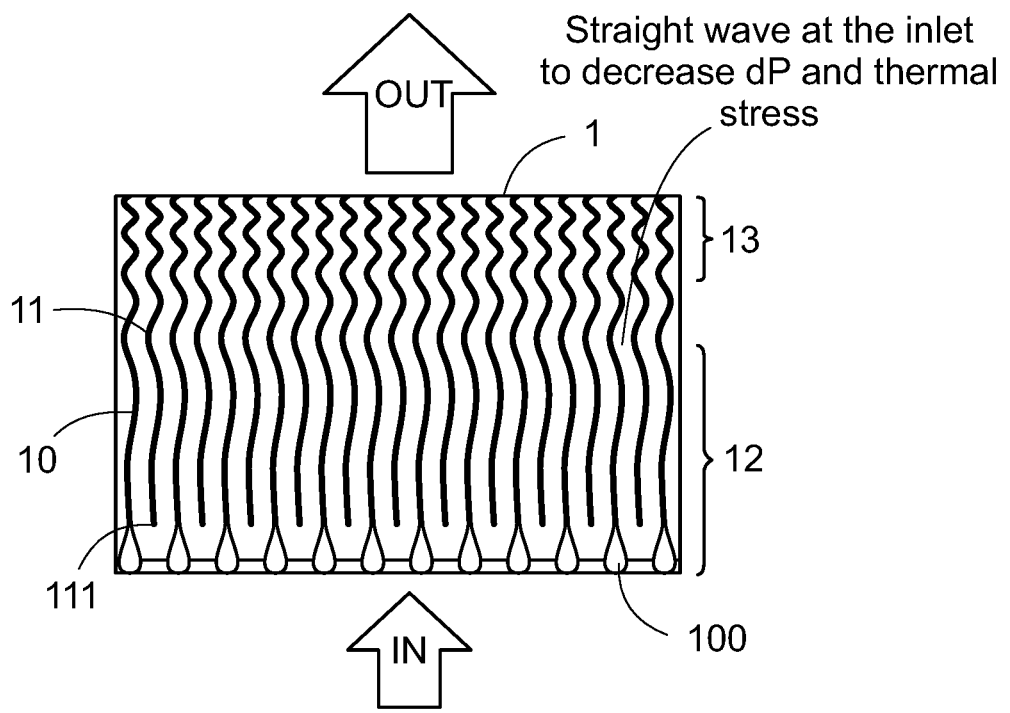
FIG. 1 is a cross section of a cooling medium (here RAM air, by way of example only) layer of a heat exchanger according to the disclosure.

FIG. 1 shows a cross section of a layer 1 of a heat exchanger where fins 10, 11 extending across the layer from a first, inlet side IN to an opposite, outlet side OUT, define flow channels for the cooling medium. In this example, the cooling medium is RAM air, but other fluids may be used. In use, this would be one of several alternative layers of fins for the cooling air (as described further with reference to FIG. 2). Between the alternate cooling layers, a heat exchanger will have hot medium layers. This layers will form flow channels for the hot medium (e.g. bleed air). The hot medium channels may provide flow of the hot fluid parallel to, but in the opposite direction, to the cold air flow, or may provide a cross-flow of the hot fluid relative to the cold fluid flow (i.e. from left to right or right to left in FIG. 1). The present disclosure is concerned with the design of the fins of a hot fluid layer and the way in which this is incorporated into a heat exchanger block and the design of the other parts of the block can be varied as required.

The fins 10, 11 are formed by additive manufacture and a subset of the fins 10 are formed to have a thickened or widened inlet end portion (leading edge) 100. In the example shown, every second fin 10 is formed with such a thickened end 100 but this is just one example. In other examples, every third, every fourth etc. fin may have such a thickened end 100.

The fins 11 located intermediate the fins 10 of the subset with the thickened end 100 are recessed from the inlet end compared to the fins of the subset i.e. the inlet ends 111 of these intermediate fins do not extend all the way to the inlet side IN.

In one example, the thickened ends 100 have a teardrop or bulbous shape but other thickened shapes could also be used.

The thickened ends 100 provide a protective front to the layer with respect to the incoming cooling medium especially RAM air and therefore provide a thickened guard surface against hailstones and impact from other things.

In a preferred example, as shown, to optimally decrease the pressure drop of the incoming fluid (RAM air) the fluid channel define by the fins 10, 11 is relatively straight (portion 12) as seen by the inlet fluid. This straight portion provides lower heat exchange between the cold layer and the hot layer (not shown) close to the inlet side IN. This is where the RAM air is the coldest and so the thermal gradient is the largest. Providing a relatively straight inlet portion 12 should decrease thermal stress in high temperature applications.

To improve the heat exchange properties of the heat exchanger, the fins can be shaped such that as they progress from the inlet side IN to the outlet side OUT they become more wavy (portion 13) defining a more tortuous path for the fluid before it exits the layer. In one example, the frequency of the waves defined by the fins increases from the inlet side IN to the outlet side OUT. The greater turbulence in the medium at this higher frequency portion 13 provides greater heat exchange with the hot medium in the adjacent layer.

Figure 2:
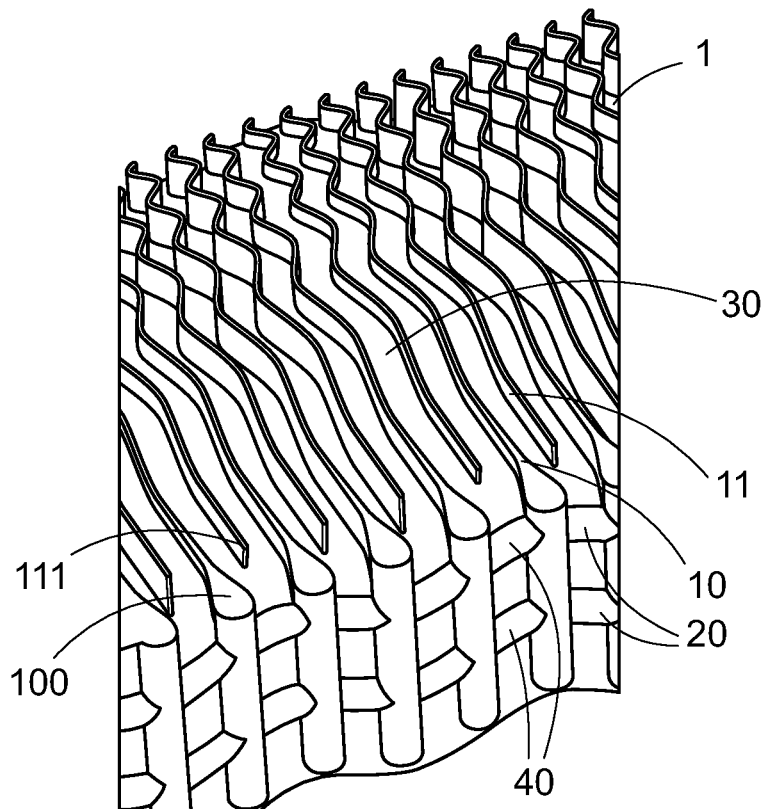
FIG. 2 is a 3D view of a heat exchanger block with a cooling medium layer such as shown in FIG. 1

FIG. 2 shows a cold medium layer 1 as described above and as shown in FIG. 1 combined with further hot and cold layers in a heat exchanger block. The example shown is a cross-flow heat exchanger, with the hot medium flowing in channels 20 and the cold medium flowing in the channels 30 defined between adjacent fins 10, 11 of the cold medium layer 1.

In applications where protection against hail, high inlet pressure, any medium pollutants and the like is desired, additional guard properties can be achieved by also forming the leading edges 40 of the hot layers to be rounded where impact occurs at the inlet IN. This results in the inlet side IN that is presented to the incoming RAM air forming a grid of rounded bars 100, 40.

By using the possibilities provided by additive manufacturing to vary fin design, the heat exchanger layer and heat exchanger incorporating such a layer can effectively guard against hail damage using existing features of the heat exchanger and without having to add additional components or additional mass to provide such protection. Further, pressure drop can be reduced and thermal stresses reduced.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A heat exchanger comprising:
a plurality of cold layers through which a cold medium flows and a plurality of hot layers through which a hot medium flows, wherein the cold layers comprise:
a heat transfer layer comprising:
an inlet side, IN, where a medium enters the layer;
an outlet side, OUT, where the medium exits the layer; and
a plurality of fins defining a plurality of flow channels for the medium from the inlet side to the outlet side, each fin having a leading edge adjacent the inlet side and a trailing edge adjacent the outlet side, and wherein the leading edge of a subset of the fins is thicker than the rest of the fin, and wherein the leading edge of the fins intermediate the fins of the subset of fins is recessed with respect to the inlet side compared to the leading edge of the fins of the subset of fins;
wherein the plurality of cold layers are arranged relative to the plurality of hot layers such that the cold medium flows in a direction parallel to but opposite to the direction of flow of the hot medium.

2. A heat exchanger as claimed in claim 1, wherein the fluid flow channels include a relatively straight portion extending from the inlet side towards the outlet side and a relatively wavy portion between the relatively straight portion and the outlet side.

3. A heat exchanger as claimed in claim 1 wherein the fluid flow channels define a wavy cross-section wherein the frequency of the wave increases from the inlet to the outlet.

4. A heat exchanger as claimed in claim 1 wherein the subset of fins comprises every second fin.

5. A heat exchanger as claimed in claim 1, wherein the leading edges of the fins of the subset of fins have a bulbous shape.

6. A heat exchanger as claimed in claim 1 wherein the leading edges of the fins of the subset of fins have a teardrop shape.

7. A heat exchanger as claimed in claim 1, wherein the leading edges of the fins are reinforced at the inlet side.

8. A heat exchanger as claimed in claim 1, being a heat exchanger for a vehicle.

9. A heat exchanger as claimed in claim 8, being a heat exchanger for an aircraft.

10. A heat exchanger of claim 1, wherein the cold medium is RAM air.

\* \* \* \* \*